UNITED STATES PATENT OFFICE.

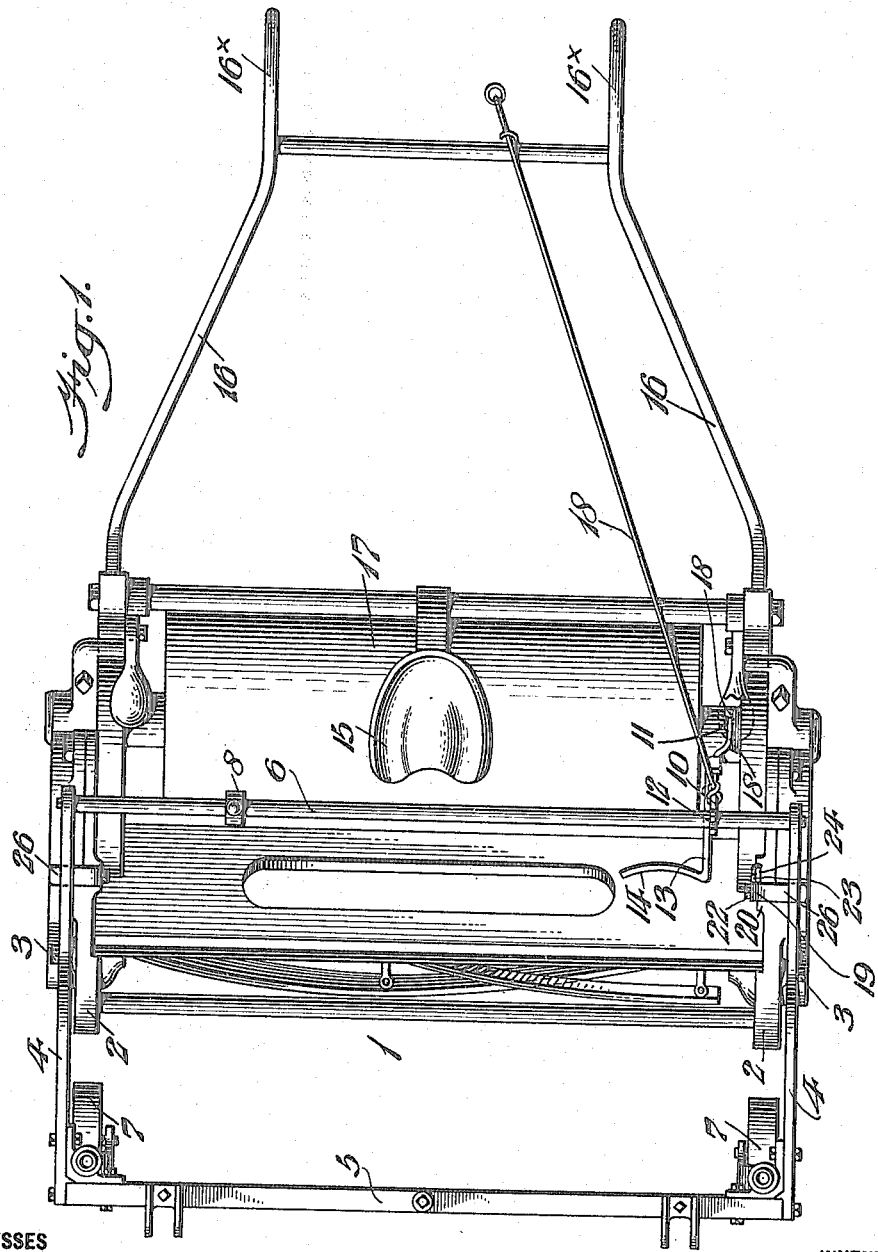

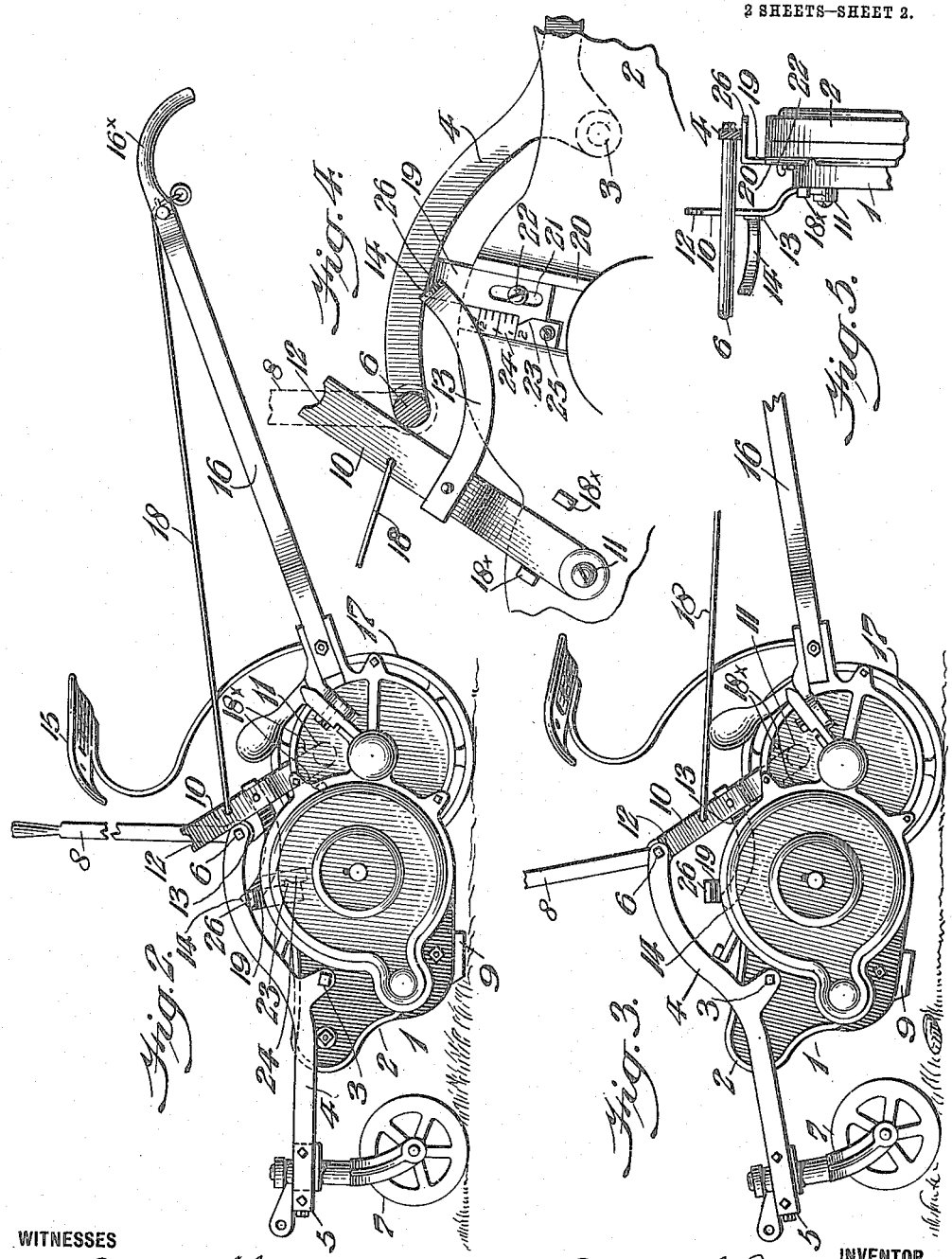

WALTER E. GRAHAM, OF PHILADELPHIA, PENNSYLVANIA.

LAWN-MOWER.

1,135,683.

Specification of Letters Patent. Patented Apr. 13, 1915.

Application filed July 21, 1914. Serial No. 852,184.

*To all whom it may concern:*

Be it known that I, WALTER E. GRAHAM, a citizen of the United States, residing in the city and county of Philadelphia, State of Pennsylvania, have invented a new and useful Lawn-Mower, of which the following is a specification.

My invention consists of a lawn mower which is adapted to have the cutting or blade member raised to allow the body of the mower to rise and fall freely, due to irregularities of the ground and to an extent to clear a stone or other obstruction in the path of said member, provision being made to accomplish the above in a power or hand guided mower.

It consists also of means for vertically adjusting said cutting or blade member relatively to the length or height that grass is to be cut.

The invention is satisfactorily illustrated in the accompanying drawing, but the important instrumentalities thereof may be varied, and so it is to be understood that the invention is not limited to the specific details shown and described.

Figure 1 represents a top or plan view of a lawn mower embodying my invention. Fig. 2 represents a side elevation thereof. Fig. 3 represents a portion of a side elevation, certain parts being in different positions from those shown in Fig. 2. Fig. 4 represents a side elevation of a portion enlarged on a side opposite to Figs. 2 and 3. Fig. 5 represents a front elevation of a detached portion.

Similar numerals of reference indicate corresponding parts in the figures.

Referring to the drawings, 1 designates a lawn mower which in the main, excepting the features of my invention applied thereto is of usual construction.

2 designates the side plates of the frame of the mower. To the same on the exterior thereof are pivotally mounted by the bolts 3, the arms 4, which are connected in front by the cross bar 5, and at the rear by the cross rod or bar 6, the latter being above the frame of the mowers, and the former in front thereof, said bar 5, and consequently the arms 4 being supported in front on the caster wheel 7, and having its rear ends disconnected from the frame, so that as said wheel rides on inequalities of the ground, and consequently lowers and rises thereon, the arms 4 oscillate on the frame, without affecting the latter, and consequently the cutter or cutting cylinder, said bar 6 having rising from it the hand lever 8, which is rigidly connected with the same, whereby by pressing said lever forward, it is raised and with it the rear of the arms 4, and as the wheels 7 rest on the ground and act as a fulcrum, the frame of the mower will be raised in front, as in Fig. 3, so that the cutters or cutting cylinder 9 will be lifted from the ground and thereby enabled to pass over stones and other obstructions in the path of the mower, without said cutters coming in contact with the same. Rearward of the cross bar 6 is the prop or latch 10 which is pivoted at its lower end to the adjacent side plates 2, as at 11, its tendency being in its normal position to rest on the cross bar 6, as in Fig. 2, and when the arms 4 are raised to fall forwardly by gravity under said cross bar and have its upper end engage automatically with the latter, as in Fig. 3, it being noticed that said upper end has thereon a bifurcation or notch 12 on which said cross bar 6 is adapted to be seated, thus holding said cross bar in elevated position and with it the rear ends of the arms 4, and consequently the front portion of the frame of the mower, thus holding the cutters above the stone or obstruction until the same has been passed over without injuring the cutters.

To the prop 10 is firmly secured the throw-off arm or trip 13, which extends forward of the same and has on its front end the laterally-extending limb 14 which is disposed conveniently below the seat 15 so that after passing the lever slightly forward a heel of the driver may strike said limb and forcibly move the arm 13 rearwardly whereby the top of the prop 10 is disengaged from the cross bar 6 when as is evident, said arms 4 are no longer controlled by said prop, and so their rear portions drop and with them the front portion of the frame of the mower, and thus said frame and the cutters resume their normal positions as in Fig. 2. This is the operation for a power mower (whether propelled by an animal or a motor), when as is evident, it is provided with the seat 15 for a driver or operator as has been referred to, the arms 4 and connection 5 forming the draft bar of the mower, but where the mower is hand-guided, the handles 16 may be pressed down when the frame rises on the drum or roller 17 of the mower as a fulcrum, thus elevating the cutting member or cutters 9. When the cross bar 6 reaches the proper height, the prop 10 drops forward by gravity beneath the same and its bifurcation 12 engages said bar and holds the latter and its connections elevated to the position shown in Fig. 3. In order to disengage said prop from said bar, the former has connected with it the rod 18 which extends therefrom to the grip 16× of the handles so as to be convenient of access by the operator for drawing the prop rearwardly and releasing said cross bar whereby it and its connections are permitted to drop and resume their normal positions as in Fig. 2.

In order to limit the forward and rearward motions of the prop 10, there are secured to the adjacent side plate 2, the lugs 18× which project therefrom on opposite sides of said prop and are spaced-apart to permit the proper movements of said prop, as most plainly shown in Fig. 4.

In order to adjust the descent of the arms 4 and so set the cutters 9 at the desired distance above the ground relatively to the height it is desired to cut the grass, there is fitted on a side plate 2, the vertical slide 19 which is freely guided in the way 20 on said plate and provided with a vertically extending slot 21 through which passes the screw 22 which enters said plate 2. On a side of said slide is the pointer or index finger 23 which is adapted to point toward the graduations 24 on the plate 25 which is attached to said plate 2. On the top of said slide is the laterally-extending limb 26 on which said arm 4 is permitted to drop, and rested when in normal position, it being evident that the slide 19 with its limb 26 may be raised or lowered to the required extent, and when adjusted retained in place by tightening the screw 22, it being seen in Fig. 1, that the slide and limb is duplicated on the opposite side of the mower, but the graduated or scale plate is sufficient on one side.

Owing to the connection of the arms 4 with the frame by the bolts 3, as has been stated, the weight of said frame with the members thereon has the tendency to draw the rear portions of said arms so that said portions rest freely on said limb 26 in their normal position, but they are permitted to oscillate from and to said limb so as to rise and lower due to the inequalities of the ground on which the front caster wheel 7 runs without jerking said frame and members thereon, while said rear portions in their descent or lowering abut against said limbs 26 as stops therefor, said limbs having been adjusted to the extent that the cutter or cutting cylinder is to be raised from the ground to adjust the same to the length or height that the grass is to be cut.

Having thus described my invention what I claim as new and desire to secure by Letters Patent, is:—

1. In a lawn mower, a frame, a cutting member thereon, an arm pivotally connected with said frame, a rotatable member on which the front of said arm is adapted to be run, sustained and fulcrumed, the rear of said arm being entirely disconnected from said frame and an abutment on said frame in the path of said rear of said arm to limit the downward movement thereof whereby the arm is permitted to oscillate freely on said frame due to the irregularities of the ground on which said rotatable member is adapted to run without disturbing the vertical adjustment of said cutting member.

2. In a lawn mower, a frame, a cutting member thereon, an arm pivotally connected with said frame, a rotatable device on which the front of said arm is adapted to be run, sustained and fulcrumed, the rear of said arm being entirely disconnected from said frame, whereby said arm is adapted to oscillate freely on said frame due to the irregularities of the ground, and a member adapted to adjust the cutting cylinder to the height or length of the grass to be cut, the same being adjustably mounted on said frame, and adapted to have the rear of said arm freely supported thereon.

3. In a lawn mower, a frame, a cutting member thereon, an arm pivotally connected with said frame, a rotatable device on which the front of said arm is adapted to be sustained, run and fulcrumed, a member on said frame in the path of said arm to support the latter at its lower limit of movement, and a latch member pivotally mounted on said frame and adapted to engage means on the rear of said arm in the elevated position of the latter to control the same when elevated.

4. In a lawn mower, a frame, a cutting member thereon, an arm pivotally connected with said frame, a rotatable device on which the front of said arm is adapted to be sustained, run and fulcrumed, a latch member pivotally mounted on said frame and adapted to engage the rear of said arm in the elevated position of the latter to control the same when in said elevated position, and a limb on said latch member adapted to be engaged by a foot of the driver as a kick-off for said latch member to disconnect it from said arm and permit the latter to drop to normal inoperative position.

5. In a mower, a frame, a cutting member thereon, an oscillating arm mounted on said frame, a rotatable device on one end of which said arm is adapted to be sustained, run, and fulcrumed, means on the free end of said arm for raising the same, and consequently said cutting member, a device to hold said arm in raised position, and a member on said device to throw it off from said arm.

6. In a mower, a frame, a cutting member thereon, an oscillating arm mounted on said frame, a rotatable device on said arm whereby it may be sustained, run and fulcrumed, the other end of said arm being entirely free from said frame, and a vertically adjustable piece on said frame on which said free end of said arm is loosely supported.

7. In a mower, a frame having a cutting member of the mower mounted thereon, an arm pivotally connected with said frame, means connected with said arm whereby it may be raised and with it said frame, thereby elevating said cutting member, a vertically movable piece on said frame adapted to engage said arm to adjust the height of said cutting member from the ground, an index finger on said piece, and graduations on said frame to which said finger is adapted to point.

8. In a mower, a frame, a cutting member thereon, an arm pivotally mounted between its ends on said frame, a rotatable device on which one end of said arm may be sustained, run and fulcrumed, means connected with the free end of said arm whereby it may be raised and with it said frame, and a pivotal latch member on said frame, the same having its upper end adapted to engage the free end of said frame in the elevated position of the latter.

9. In a mower, a frame having a cutting member of the mower mounted thereon, an arm pivotally mounted between its ends, a device on which one end of said arm is adapted to be sustained, run and fulcrumed, the other end of said arm being entirely free of said frame, an operating member pivotally connected with the free end of said arm, and a gravitating latch member adapted to control the free portion of said arm when elevated.

10. In a mower, a frame having a cutting member of the mower mounted thereon, an arm pivotally mounted between its ends, means connected with the rear end of said arm whereby it may be raised and with it said frame to elevate said cutting member, a device on which the front end of said arm is adapted to be sustained, run and fulcrumed, a gravitating latch member adapted to engage the free end of said arm when raised, and a member connected with said latch member to trip the same to allow said arm to drop.

WALTER E. GRAHAM.

Witnesses:
N. F. CRESSMAN,
W. K. JONES.

Copies of this patent may be obtained for five cents each, by addressing the "Commissioner of Patents, Washington, D. C."